Sept. 17, 1946.   G. W. LESCHER ET AL   2,407,709
MANUALLY OPERATED ARRESTING HOOK
Filed Aug. 10, 1937

G. W. Lescher,
W. H. Steet,
INVENTORS;

BY
Robert C. Basche
ATTORNEY

Patented Sept. 17, 1946

2,407,709

UNITED STATES PATENT OFFICE 2,407,709

MANUALLY OPERATED ARRESTING HOOK

George W. Lescher, Garden City, and Walter H. Steet, Roosevelt, N. Y., assignors to Republic Aviation Corporation, a corporation of Delaware Application August 10, 1937, Serial No. 158,274

6 Claims. (Cl. 244—110)

The present inventive concepts relate to the arresting-gear of aircraft, particularly those aircraft which are operated from special aerodromes, such as the flying deck of an aircraft-carrier.

More specifically, the invention is concerned with an operating mechanism for such arresting gear, and its chief object is to provide arresting-gear retracting and extending mechanism which will incorporate a control member which can be operated as instinctively, especially by military pilots, as firing a pistol, thus distracting their attention from their other piloting duties as little as possible.

It is also one of the objects of the invention to provide an operating member per se which will be smooth, easy and dependable in operation, embodying no danger of jamming or transverse rotation, as at the crucial moment of landing or taking off, and instead being practically "fool-proof."

A further particular object of the invention is to provide an improved retracting-gear operating control of this type which will involve no cumbrous parts and instead will incorporate but the minimum of parts to thereby not only render operation and installation simple, but to adapt it to rapid, large-scale production, yet which will be rugged and durable withal.

The other objects, results and advantages of the invention will manifest themselves as this disclosure progresses.

An illustrative form of the invention is shown in the accompanying drawing, but it is to be understood that the invention is limited in its embodiments only by the scope of the subjoined claims. In the drawing—

Figure 1:
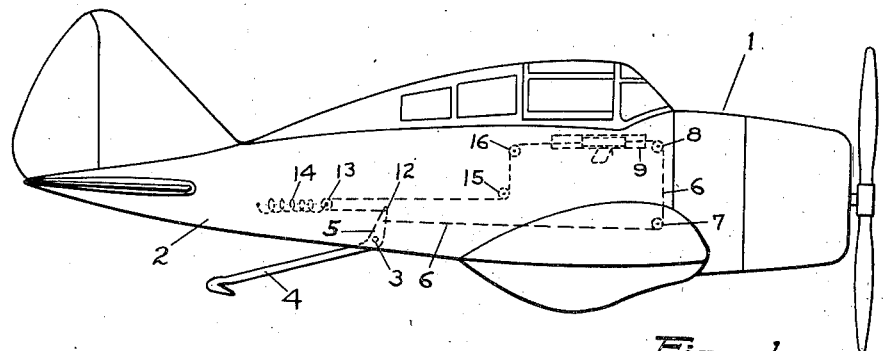
Figure 1 is a diagrammatic side-elevation of an airplane of the type used on board aircraft-carriers, with the arresting hook partially down, preparatory to alighting on the deck of the carrier.
Figure 2:
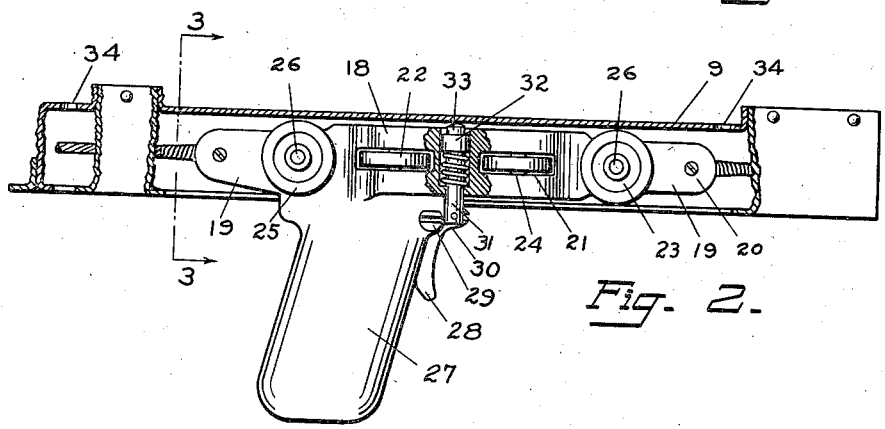
Figure 2 is a side-elevation, partly broken away and partly in section, of an important component of the invention.

Arresting-gear operating controls have been proposed hitherto, but they have usually involved concentric tubes, one bearing a cam-handle, or latch, or rotatable lever, with consequent liability of undesired instability, and lateral rotation and concomitant excessive friction or jamming of the grip member; or bending, buckling and jamming of the concentric tubes, obviously thus rendering the control inoperative just when needed most; or else have involved cumbersome "throttle-handle" devices.

The structure shown in the drawing comprises an airplane 1, having a fuselage 2, and the rest of the components of a high-speed aircraft-carrier airplane. Suitably mounted on a transverse pivot 3, near the bottom of the fuselage is an arresting hook 4, here shown as partially in extended position for engaging suitable complementary means on the deck of the carrier. The hook includes a bellcrank extension 5, projecting some distance upwardly into the rear interior of the fuselage. Near the end of the lever 5 is attached one terminus of an endless cable 6, which cable leads thence around a fixed pulley 7, attached to the left-hand side of the fuselage, as shown, and thence around another fixed pulley 8, attached above the first pulley and adjacent the pilot's left-hand. Thence the cable enters a tube, or casing 9, here shown as substantially square in cross-section, and attached by means of brackets 10 and 11, riveted to the skin of the fuselage and to the casing, as best seen in Fig. 3.

The other terminus 12, of the endless cable 6, is attached at, or very near, the extremity of the lever 5, whence it passes over a spring-mounted floating pulley 13. The spring 14 resiliently loads the entire cable and all members attached thereto. From the pulley 13, the cable passes around a fixed pulley 15, which directs it upwardly to another fixed pulley 16, whence it passes into the box, or casing 9.

Figure 3:
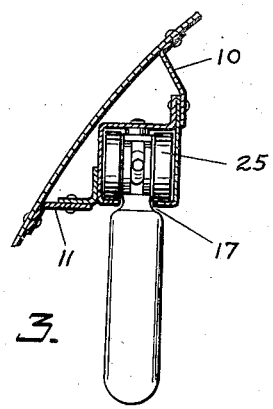
Figure 3 is a cross-section on line 3—3 of Fig. 2.

The casing 9 is hollow, and its bottom face, as best seen in Fig. 3, is longitudinally slotted, as at 17. A longitudinal member 18 in the casing 9 includes a pair of special plates having ears 19 at each end, and the endless cable has its upper termini securely clamped, or otherwise fastened therebetween, as at 20. The longitudinal member 18 is bellied out in its central portion, as shown, and includes horizontal slots 21, in which are horizontally mounted rollers 22, carrying a ball-bearing mechanism, such as 23, on vertical shafts 24. The rollers 22 are each of such diameter as to contact, at the ends of their diameters, the contiguous sides of the casing 9. Similar rollers 25 are similarly ball-bearing mounted on horizontal, transverse shafts 26, and contact the bottom inner walls of the casing 9.

This combination of rollers working against the respectively opposite sides of a hollow casing, obviates the necessity for employing the usual levered-cylinder with the lever working in a down-ended cam-way in a concentric cylinder, or the like, with consequent danger of jamming, wobbling travel of the handle, etc.

Projecting downwardly through the slot 17, from the lower edge of the longitudinal member 19, is a pistol-like combination comprising a butt, or grip 27, having a trigger 28 pivoted thereto at 29. The trigger 28 is preferably constructed in the form of a bellcrank lever, the other arm of which, 30, is pivotally connected to a spring-loaded, vertically reciprocating rod 31. The rod is loaded, preferably, by a helical spring, as shown. The rod bears a head 32, engaging a detent-member 33, for engaging with holes 34. A hole 34 is provided at each of those points along the upper face of the casing 9 corresponding to the fully retracted, or fully extended, positions of the hook 4, and serve to positively, but disengageably, lock the hook in either position.

Thus, by means of the pistol-grip and trigger, and the high efficiency provided by the system of pulleys and endless cable, the hook 4 may be easily, quickly, and accurately adjusted to the desired position, and with one hand, leaving the pilot substantially free to attend to the many other adjustments he has to make in the cockpit, especially when landing or taking off. He merely grasps the operating handle instinctively, as he would a pistol, and moves it forwardly, or backwardly, to its extreme limits of travel, whereupon, on releasing the handle, the trigger forces the lock 33 upwardly into locking engagement with the inside of the casing, and at the proper angle of adjustment of the hook.

Various other ramifications and refinements of the invention are included within the scope of the subjoined claims; for example, the hook may retract completely inside the fuselage, and the lock 33 may be made integral with the rod 31, etc.

Having now disclosed our invention, and at least one mode of executing it, in such full, clear and exact terms, according to statute, as to enable anyone skilled in the art to make and use same, what we claim as our invention and desire to secure by Letters Patent of the United States, is:

1. An airplane arresting gear, comprising a member for engaging a complementary member extraneous to the airplane, a transverse pivot for the first said member in the bottom of the fuselage, a portion of said first member projecting upwardly into said fuselage to constitute said first member a bellcrank, a spring-loaded endless cable having one terminus attached to one arm of said bellcrank near its pivot and one terminus attached to said arm nearer its upper end, and a substantially frictionless, non-rotatable, force-applying member in mechanical circuit with said cable for retracting and extending said engaging member.

2. A control device for retracting and extending the arresting gear of an aircraft, comprising an elongated, hollow member, a longitudinal member therein, connecting means for applying force to the gear, means on said connecting member for supporting same in said hollow member by contact with the walls thereof, a spring-loaded plunger therein, a wall of the elongate member having apertures at positions correspondingly respectively to the retracted and extended positions of the arresting gear, and adapted to embrace said plunger, and manually-instinctive means for unlocking and moving said longitudinal member from arresting gear retracted to arresting gear extended positions, and vice-versa.

3. A control apparatus for retracting and extending a cable-operated arresting hook on an airplane, comprising a hollow elongate casing member, a pair of united, centrally bowed members therein; ear clamps for the cable at each end of said members, a vertically extended ball-bearing roller mounted on a horizontal axis in each of said ears, and rollable along the top and the bottom walls of said casing-member, and a pair of horizontally extending ball-bearing rollers mounted on vertical axes in the central portion of said united longitudinal members.

4. A control apparatus for retracting and extending a cable-operated arresting hook, comprising a hollow, elongated casing member, a pair of united elongated members frictionlessly mounted therein, the bottom wall of the casing member having a longitudinal slot therein, a pistol-grip member extending downwardly therethrough, a well extending substantially vertically of said united elongated members, a headed-plunger therein, a helical spring therearound and loading said plunger, the upper wall of said hollow casing having apertures therein at suitable points, a detent-member for being forced into one or the other of said apertures on occasion, and a bellcrank lever pivoted to said pistol grip in the position of a trigger, one arm of said lever acting as a trigger and the other being pivotally attached to the lower end of said plunger for actuating same.

5. In an airplane arresting gear, a control member comprising a casing having a longitudinal slot through its wall, a member reciprocable therein and having a portion thereof extending outwardly through said slot to provide a hand grip, a lock member carried by said reciprocable member, an abutment associated with said casing, means yieldably urging said lock member in a direction to engage the abutment in one position of the reciprocable member and a trigger associated with the reciprocable member adjacent the hand grip for disengaging the lock member from the abutment.

6. An airplane arresting gear comprising an arresting hook pivotally mounted upon the fuselage of the airplane and having an extension located on the opposite side of the pivotal mounting from the shank of said hook, a cable having its ends connected to said extension so as to rotate the hook in opposite directions about its pivotal mounting according to the direction of pull upon the cable, guides supporting said cable in the form of a loop, and a control member in circuit with said cable, said control member comprising a member adapted to reciprocate within a casing and having a hand grip extending beyond said casing the arrangement being such that movement of the reciprocable member in a direction forwardly of the airplane lowers the hook, means for locking said reciprocable member against movement in the casing and a trigger associated with the reciprocable member for actuating said locking means.

GEORGE W. LESCHER.
WALTER H. STEET.